INVENTOR
DANIEL GRUDIN

May 29, 1956 D. GRUDIN 2,747,818
NOSE LANDING GEAR WITH INTERNALLY CASTERED AND STEERED WHEEL
Filed Oct. 9, 1953 3 Sheets-Sheet 2

INVENTOR
DANIEL GRUDIN

BY

ATTORNEY

May 29, 1956   D. GRUDIN   2,747,818
NOSE LANDING GEAR WITH INTERNALLY CASTERED AND STEERED WHEEL
Filed Oct. 9, 1953   3 Sheets-Sheet 3
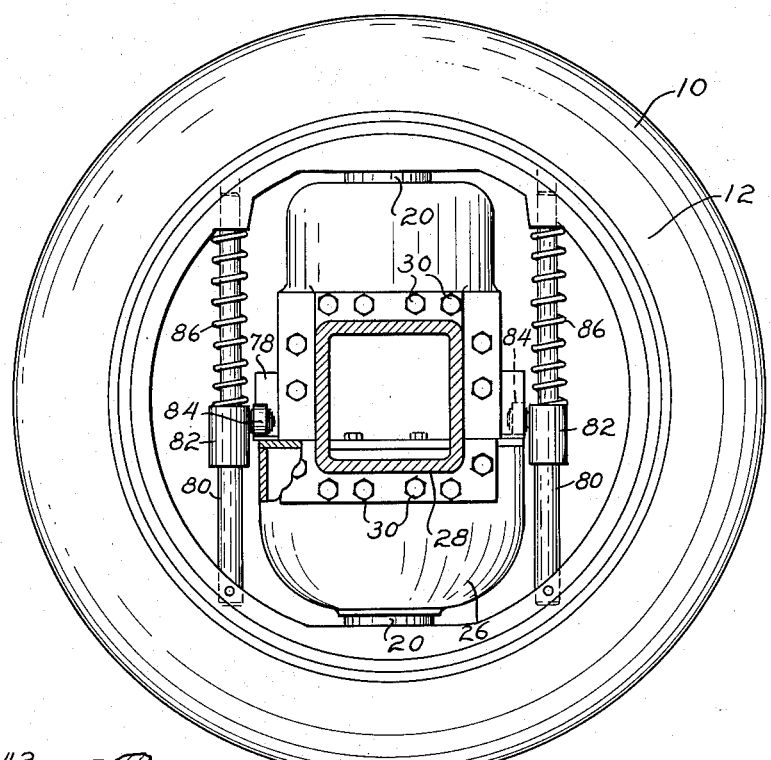
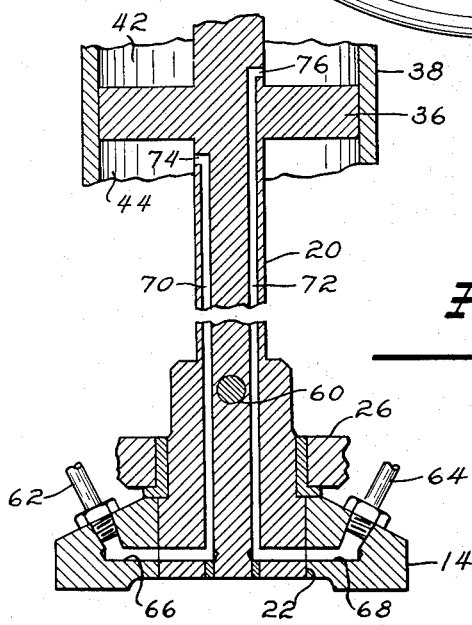
INVENTOR
DANIEL GRUDIN
BY
ATTORNEY

United States Patent Office 2,747,818
Patented May 29, 1956

2,747,818

NOSE LANDING GEAR WITH INTERNALLY CASTERED AND STEERED WHEEL

Daniel Grudin, Trenton, N. J., assignor to Stroukoff Aircraft Corporation, West Trenton, N. J., a corporation of New York Application October 9, 1953, Serial No. 385,063

10 Claims. (Cl. 244—50)

This invention relates to castered wheels and, more particularly, to a steerable castered wheel especially designed for use as the nose wheel of an aircraft having a tricycle landing gear. Although the invention will be described with reference to a nose wheel for aircraft, it will be understood that other uses are possible.

Castered wheels for aircraft are known in the art, but steerable castered wheels and, particularly, power steering mechanisms for such wheels have not been developed heretofore.

Therefore, it is an object of this invention to provide a wheel which is internally castered and is also provided with an internal power steering mechanism.

It is another object of this invention to provide a wheel of the type described which has an extremely low swiveling mass to thereby decrease shimmying tendencies.

It is another object of this invention to provide a wheel of the type described which makes possible the use of nose gear of maximum torsional rigidity, with consequent reduction of shimmying tendencies.

It is another object of this invention to provide a wheel of the type described in which the power steering mechanism also serves as a shimmy dampener.

It is another object of this invention to provide an axle having a wheel rotatably mounted thereon for steering movements relative thereto, whereby the axle can be secured to a vehicle in fixed relation thereto, relative to the movements of the wheel in steering the vehicle.

It is a further object of this invention to provide a wheel of the type described of simple design, with resulting manufacturing economies, of minimum weight, and of fail-safe construction.

Other objects and advantages of the invention will be apparent from the following description and accompanying drawings, in which:

Figure 3 is a side elevational view of the mounting shown in Figure 1 with parts cut away to show details more clearly.

Figure 4 is an enlarged, fragmentary, vertical sectional view of the mounting shown in Figure 1 and illustrating details of the pressure fluid connections.

Figure 1:
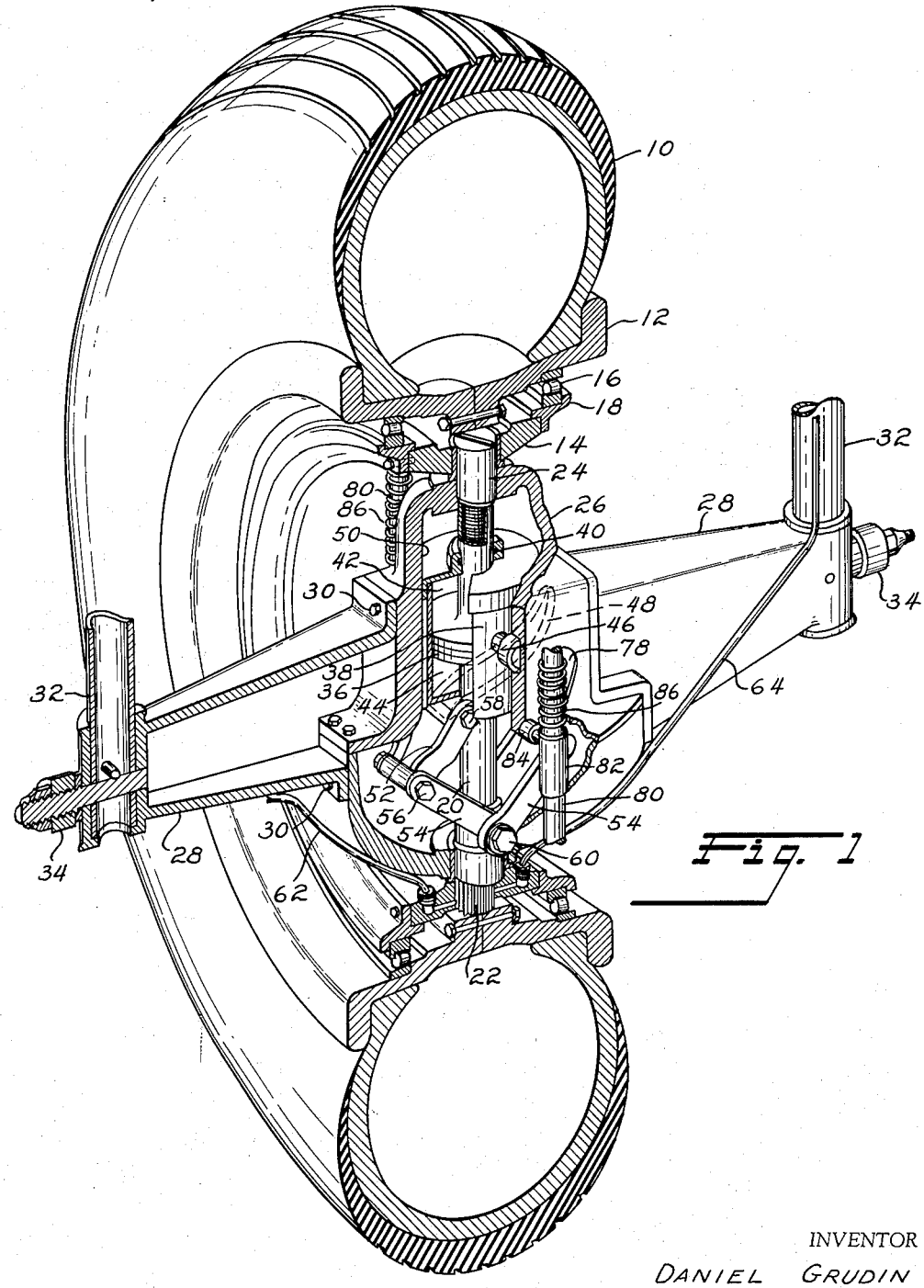
Figure 1 is a cut-away perspective view of a wheel mounting embodying this invention.
Figure 2:
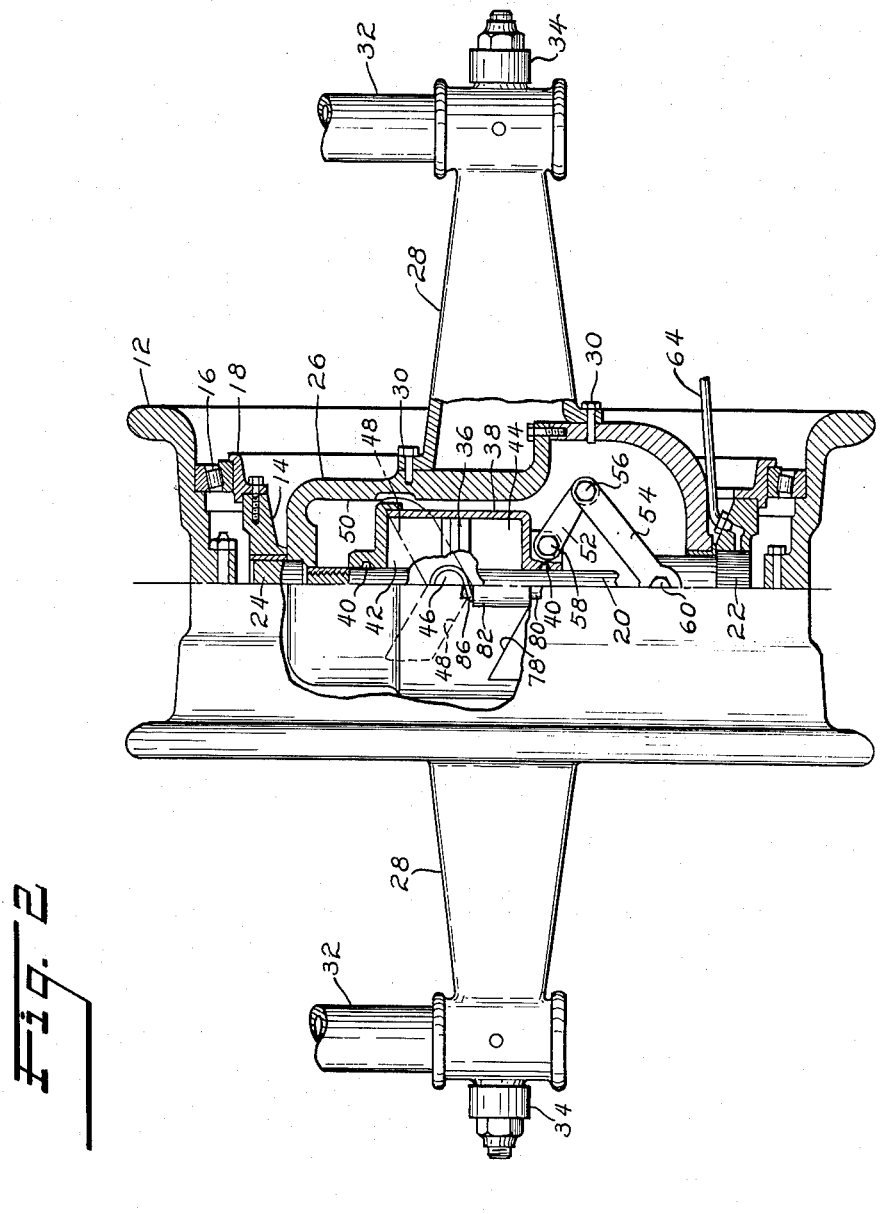
Figure 2 is a front elevational view, partially in vertical section, of the mounting shown in Figure 1.

Referring now to the drawings, there is shown an internally castered steerable wheel embodying this invention. The wheel proper comprises a conventional tire 10 mounted on a split rim 12. The rim 12 is mounted for rotation on an annular, non-rotatable hub 14 by means of anti-friction bearings, such as the roller bearings 16, having their raceways clamped to each side of the rim, in operating position between the rim and the hub, by retaining rings 18.

A kingpin or spindle 20 extends diametrically and is secured to the hub 14, one end of the pin having a spline 22 thereon, fitting in a correspondingly splined opening in the hub, and the other end of the pin having a headed screw 24 threaded axially therein through the hub. Thus, the pin is rigidly secured to the hub 14. The pin 20 passes through and is journalled in the opposite ends of a two-part elongated hollow casing 26 constituting the central portion of an axle which includes aligned arms 28, secured as by screw 30, to opposite sides of the casing. Normally the axle, i. e. the arms 28, extends perpendicularly of the hub 14. To the outer ends of the axle arm 28, the legs 32 of a fork comprising a portion of a landing gear (not shown) may be rigidly secured. Further, extensions 34 on the axle arms 28 may provide pivotal mountings for other parts of the landing gear.

Rigidly mounted on or integral with the kingpin 20 within the casing 26 is a piston 36 enclosed within a complementary cylinder 38 that is mounted for axial, slidable movement on the kingpin. Appropriate seals, such as O-rings 40, are interposed between the ends of the cylinder 38 and the kingpin 20 to provide two pressure chambers 42 and 44 within the cylinder on opposite sides of the piston 36. Diametrically aligned, radially disposed cam followers on rollers 46 are secured to opposite exterior sides of the cylinder 38 and project into cam grooves 48 formed in a cylindrical interior wall portion 50 of the hollow casing 26. The grooves 48 are helically inclined so that axial movement of the cylinder 38 on the pin 20 effects rotary movement relative to the casing 26 and, consequently, relative to the axle. Preferably, the cam grooves are so shaped that the cylinder 38 will rotate through relatively small arcs for a given axial displacement thereof at positions of the wheel near its centered position relative to the axle, but through larger arcs for the same axial displacement at positions of the wheel which are farther from centered position. Thus, steering sensitivity at high speeds is reduced.

It will be seen from the foregoing construction that if the kingpin rotates with the cylinder 38, the wheel will be turned by axial movements of the cylinder. Although various means may be employed for mounting the cylinder 38 on the kingpin 20 against relative rotational movement therebetween, a strong and relatively non-binding construction comprises two pairs of links, with the two links 52 and 54 of each pair being pivotally connected together, as by a pivot pin 56. The other ends of the links 52 and 54 of each pair are pivotally connected to the cylinder 38, adjacent to one end thereof by a pivot pin 58, and to the kingpin 20, respectively. Preferably, each pair of links 52 and 54 is pivotally connected to the kingpin 20 by a single pivot pin 60, extending transversely therethrough.

Axial movement of the cylinder 38 is effected by the admission and exhaust of pressure fluid to and from the pressure chambers 42 and 44 in the cylinder on opposite sides of the piston 36 therein. For this purpose, two flexible hoses 62, 64 leading from appropriate control valves (not shown) are connected to appropriate drilled conduits 66 and 68 in the hub 14, which communicate with appropriate drilled conduits 70 and 72 in the kingpin 20, as best shown in Figure 4. The conduits 70 and 72 terminate in radial ports 74 and 76, respectively, immediately adjacent to and on opposite sides of the piston 36.

In order for the wheel to be positively centered in the event of failure of pressure fluid, and also to provide shimmy dampening for the wheel, the hollow casing 26 is provided with ridges or flanges on opposite sides thereof forming generally V-shaped cam surfaces 78. Secured to the hub 14 on opposite sides of and extending parallel to the kingpin 20, are a pair of rods 80. A sleeve 82 is slidable on each rod 80 and has a radial cam follower or roller 84 thereon engaged with the corresponding cam surface 78. Coil compression springs 86 interposed between each sleeve 82 and the hub 14 constantly urge the cam followers 84 against the cam surfaces 78 to thereby urge the wheel to its centered position.

It will thus be seen that the objects of this invention have been fully and effectively accomplished. Positive steering control for the wheel may be had at all times. Additionally, by means of appropriate valve mechanism in the two pressure chambers 42 and 44, hydraulic fluid may be utilized as a shimmy dampener in addition to the springs 86, cam follower 84, and cams 78. Further, it will be seen that the hydraulic steering mechanism is fail-safe, so that in the event of failure of hydraulic pressure fluid, the wheel will become a free castering wheel with operable shimmy dampening.

It will be realized that various changes are possible in the specific embodiment, illustrated and described to point out the principles of this invention, without departure from such principles. Therefore, this invention includes all modifications encompassed within the spirit and scope of the following claims.

I claim:

1. A steerable castering wheel comprising: a wheel; means journally supporting said wheel; an axle; kingpin means disposed in the mid-plane of said wheel and fixed to and pivotally mounting said wheel supporting means on said axle for castering movement of said wheel; and controllable means attached to said kingpin means for pivoting said kingpin means to steer said wheel.

2. A steerable castering wheel comprising: an annular hub; a wheel mounted for rotation thereon; an axle extending within said hub; kingpin means disposed in the mid-plane of said wheel and fixed to and pivotally mounting said hub on said axle for castering movement; and controllable means attached to said kingpin means for pivoting said kingpin means relative to said axle for steering said wheel.

3. The structure defined in claim 2, in which the means for pivoting the kingpin means is enclosed within the axle.

4. A steerable castering wheel comprising: an annular hub; a wheel mounted for rotation thereon; an axle extending within said hub; a kingpin fixed diametrically to said hub and pivotally connected to said axle for castering movement of said hub relative to said axle; and controllable power-operated means for pivoting said kingpin to steer said wheel.

5. The structure defined in claim 4, including means tending to center the kingpin and the wheel comprising means defining a cam surface on the axle and a spring-pressed follower on the hub riding said surface.

6. The structure defined in claim 4, in which the controllable means includes: a piston on the kingpin; a cylinder slidable on the piston; means restraining relative rotation between said piston and said cylinder; means for effecting rotation of said cylinder relative to the axle upon axial movement of said cylinder; and means for admitting and exhausting pressure fluid to and from said cylinder on opposite sides of said piston.

7. A steerable castering wheel comprising: an annular hub; a wheel mounted for rotation thereon; an axle extending within said hub and having a hollow casing portion therein; a kingpin fixed diametrically to said axle and extending for pivotal movement through said axle casing portion; a piston on said kingpin within said casing portion; a cylinder slidable on said piston; an interior cam groove on said casing portion; a follower on said cylinder engaged in said groove for effecting rotation of said cylinder upon axial movements thereof; links connecting said kingpin to said cylinder for rotation therewith; and means for admitting and exhausting pressure fluid to and from said cylinder on opposite sides of said piston.

8. The structure defined in claim 7, in which the admission and exhaust means include conduits within the kingpin.

9. In a steerable castering wheel, the combination comprising: a wheel support including a substantially vertical spindle having a piston thereon; means mounting said support for castering movements; and power-actuated controllable means for turning said support to steer the wheel, including a cylinder slidable on said spindle means for effecting rotation of said cylinder upon reciprocating movements thereof, and means connecting said spindle to said cylinder for rotation therewith.

10. A steerable wheel assembly comprising: an axle adapted to be attached to a vehicle for only shock absorbing movements relative thereto when said axle is in vehicle-supporting position; a wheel; means mounting said wheel on said axle for rotation thereabout and for pivotal steering movements about an axis disposed transversely thereof said means including an annular hub and a kingpin secured diametrically thereto and mounted transversely on said axle for pivotal movement about said axis; and controllable means for pivotally moving said kingpin about said axis for steering said wheel.

References Cited in the file of this patent

UNITED STATES PATENTS

| 1,252,282 | McIntyre | Jan. 1, 1918 |
| 1,866,724 | Raule | July 12, 1932 |
| 2,086,814 | McCollum | July 13, 1937 |
| 2,629,571 | Wolf | Feb. 24, 1953 |

FOREIGN PATENTS

| 542,648 | Great Britain | Jan. 21, 1942 |